United States Patent [19]
Abrams et al.

[11] 4,278,549
[45] Jul. 14, 1981

[54] MAGNETIC CONDITIONING OF LIQUIDS

[76] Inventors: Joseph L. Abrams, 960 Apple La.; Arthur D. Maynard, 624 Riverview Ave., both of Altamonte Springs, Fla. 32701

[21] Appl. No.: 95,625

[22] Filed: Nov. 19, 1979

[51] Int. Cl.³ .............................................. C02F 1/48
[52] U.S. Cl. .................................. 210/695; 204/155; 210/696; 210/222; 335/306
[58] Field of Search ................... 204/155, 157.1, 248; 210/425, 57, 58, 222, 223, 243, 695, 696; 335/306

[56] References Cited

U.S. PATENT DOCUMENTS

| | | | |
|---|---|---|---|
| 2,652,925 | 9/1953 | Vermeiren | 210/222 |
| 2,939,830 | 6/1960 | Green et al. | 204/248 |
| 3,345,594 | 10/1967 | Vermeiren | 210/222 |
| 3,680,705 | 8/1972 | Happ et al. | 210/222 |
| 3,923,660 | 12/1975 | Kottmeier | 210/222 |
| 4,146,479 | 3/1979 | Brown | 210/222 |

FOREIGN PATENT DOCUMENTS

| | | | |
|---|---|---|---|
| 209713 | 7/1957 | Australia | 210/222 |
| 858781 | 1/1961 | United Kingdom | 210/222 |
| 420340 | 8/1974 | U.S.S.R. | 210/222 |

*Primary Examiner*—Peter A. Hruskoci

[57] ABSTRACT

Method and apparatus for magnetically treating aqueous and non-aqueous liquid streams to enhance their flow properties and to reduce their tendency to deposit scales, encrustations and the like, wherein the liquid stream for treatment, either immediately prior to or substantially simultaneously with its traversal of a high density, magnetic flux field having a normal orientation with respect to the primary flow path of the liquid stream is deflected along secondary flow paths angularly displaced from the primary flow path causing in effect a high velocity, essentially shear angle traversal of the flux field by said stream. Apparatus therefor includes a plurality of permanent magnet groups arranged in parallel within a hollow casing or housing, each of said groups comprising a plurality of superposed, elongated magnets in registered, overlying relationship polarized along their longitudinal axis, the latter being parallel to the primary flow path, the adjacent magnet groups providing liquid passageways therebetween and generating magnetic flux paths essentially normal to the primary flow path.

7 Claims, 9 Drawing Figures

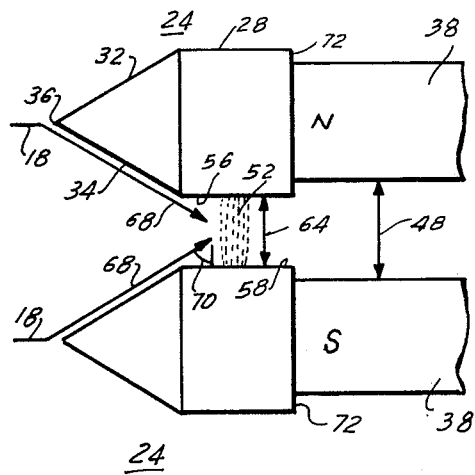
FIG. 1A
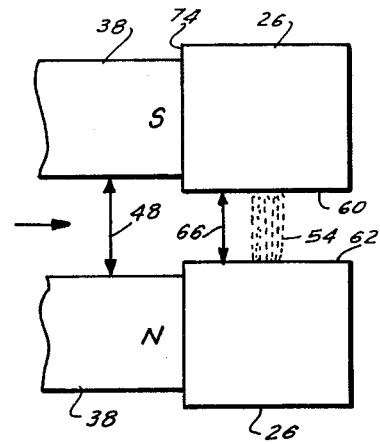
FIG. 1B
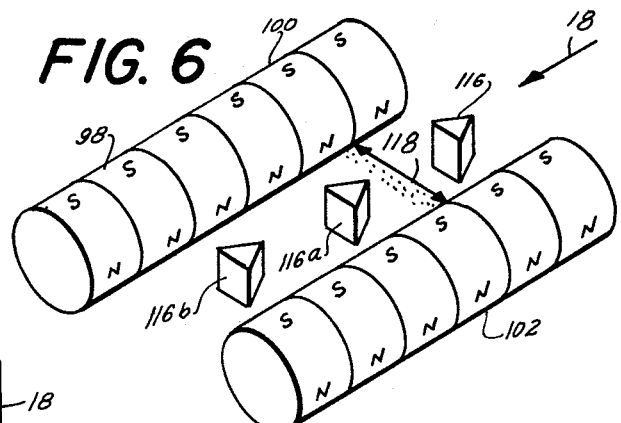
FIG. 6
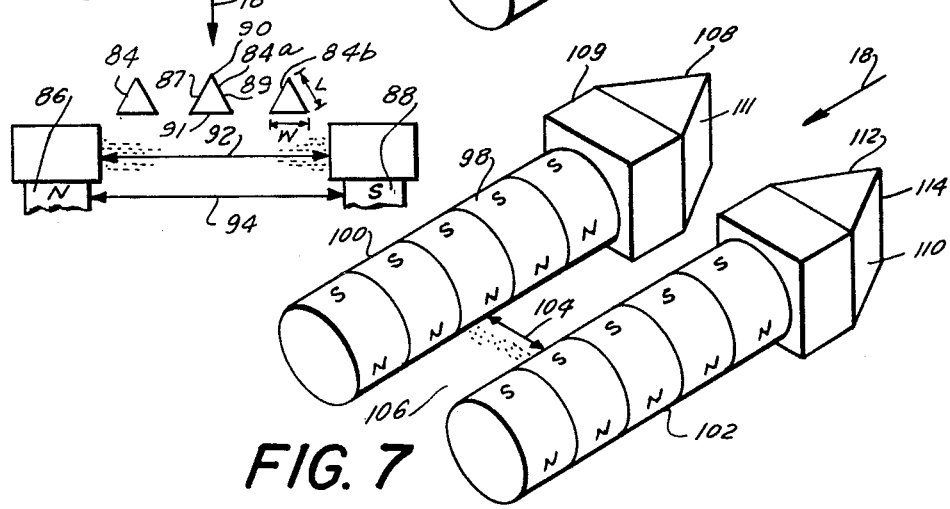
FIG. 5
FIG. 7

MAGNETIC CONDITIONING OF LIQUIDS

BACKGROUND OF THE INVENTION

1. Field of the Invention

The invention relates to the magnetic treatment of liquids and in particular to method and apparatus enabling the treatment of calcarious water and other aqueous and non-aqueous streams to enhance their flow properties and to reduce their corrosive effects on surfaces contacted by such streams.

Methods and associated apparatus for effectively reducing the tendency of calcarious water, for example, to deposit scales, encrustations and the like on heat exchange, conduit and other surfaces and based essentially upon the use of permanent magnets for the generation of magnetic fields to provide a magnetic treatment zone are described in the prior art in a variety of forms. In essence, the relevant techology requires, for beneficial treatment, that the contaminated water traverse one or more magnetic treatment zones, each being the locus of a high density magnetic flux, to yield a product water having reduced corrosive tendencies. The precise mechanism by which such beneficial effects obtain has not been definitely ascertained. In any event, it is hypothesized that the corrosive species present in the source water are, as a result of the the prescribed magnetic treatment, converted according to some chemical, electrochemical, physiochemical, etc., mechanism to an inert form non-injurious to conduit and process equipment surfaces. Theories thus far postulated range from the generation of induced polarization effects causing the formation of inert molecular complexes to the neutralization of the corrosive species by contact thereof with oppositely charged components in the water or with environmental surfaces. Thus, polarization and consequent orientation of the contaminants is said to increase their mobility and possible surface area within the aqueous medium correspondingly enhancing the likelihood of some form of neutralization reaction.

As will be recognized, the likelihood of scale formation in a particular instance is directly related to the residence time of the source, untreated water as well as the total water flow within a particular surface-contacting zone. For example, the recent emphasis on evaporative cooling principles with air cooled refrigeration systems e.g., home air conditioning units, has led to structural modifications wherein a water spray is directed onto the condenser coils. The amount of water used for such purposes is relatively small and thus the water flow over the condenser coils is minimal. Under such conditions, the deleterious effects of the corrosive species present in the water are most evident. Scale formation and the like severely reduce the efficiency of heat transfer across the affected surface correspondingly increasing unit energy requirements.

In view of escalating energy demands, the importance of making, for example, evaporative cooling systems feasible from both operational and economical standpoints is obvious.

Techniques heretofore promulgated for the magnetic treatment of calcarious water involve as an essential expedient the intersection of the calcarious water with a zone of high density magnetic flux. Approaches to the problem have focussed on such considerations as the water flow path relative to the flux field, flow path relative to the polar axes of the magnets as well as the type and orientation of permanent magnets to be used. As will be appreciated, numerous permutations within the scope of the aforedescribed variants may be efficacious as is evident from the prior art. Thus, flow parallel or normal to the polar axis of the magnets in conjunction with permanent magnets of the bar type polarized longitudinally or facially along their axes of symmetry are described. Whatever the arrangement, the primary objective of the magnetic treatment is to assure a thorough decontamination of the water to the fullest extent possible. In some instances, provision is made for multiple passage of the source water through the magnetic treatment zone. Representative here is U.S. Pat. No. 4,146,479 which describes a magnetic water conditioner wherein a plurality of coaxially arranged disc type magnets, polarized diametrically, are confined within a generally cylindrical sheath having outer, circumferentially spaced and radially extending rib portions, the longitudinally extending paths defined by such ribs defining, in conjunction with a casing of high permeance for the assembly, the annular passageways as well as zones of magnetic treatment. Source water is caused to traverse each of the annular passageways prior to exiting the device.

In general, prior art methods for magnetically treating calcarious water require relatively complex and expensive structural modifications of existing facilities for their effective implementation. Moreover, optimum effects may require the use of more than one unit and/or the use of yet additional features to achieve, for example, the advantage of increased water velocity through the magnetic treatment zone.

In accordance with the discovery forming the basis of the present invention, it has been ascertained that the beneficial effects of the magnetic treatment can be enhanced significantly by relatively simple means embodying a principle practicably applicable to conditioners currently available commercially with a minimum of structural modification, or in the form of a unitary device useful as an effective alternative or adjunct to known magnetic conditioners.

Thus, a primary object of the invention is to provide method and apparatus for the magnetic treatment of calcarious water and other liquid streams wherein the foregoing and related disadvantages are eliminated or at least mitigated to a substantial extent.

Another object of the invention is to provide method and apparatus capable of effectively reducing the tendency of calcarious water and other liquid streams to deposit scales, encrustations and other foulants on conduits, process equipment and other surfaces contacting the flowpath of such water as well as to enhance the flow properties of such streams.

Yet another object of the invention is to provide such method and apparatus capable of simple implementation with existing facilities and wherein requirements for structural modification are minimized.

Still another object of the invention is to provide such method and apparatus capable of effective use either in conjunction with or as an alternative to known magnetic water conditioning treatments.

A further object of the invention is to provide such an apparatus capable of simple and economical manufacture from materials readily available commercially.

Other objects and advantages of the invention will become apparent hereinafter as the description proceeds.

Attainment of the foregoing and related objects is made possible in accordance with the invention which, in its broader aspects, includes a method for treating aqueous and non-aqueous liquid streams to enhance their flow properties and to reduce their tendency to deposit scales, encrustatations and the like, comprising directing said stream along a primary flowpath to contact and traverse a high density magnetic flux field having a directional orientation, i.e., flux or polar axis, substantially normal to said primary flow path and wherein said stream, either immediately prior to or substantially simultaneously with its contacting said flux field, contacts deflecting means for directing said stream along secondary flow paths angularly displaced from said primary flow path or direction thereby causing an essentially shear angle traversal of said flux field by said stream.

In a further aspect, the invention includes apparatus for such a method comprising an enclosure having inlet means for admitting a liquid stream to said enclosure, means for directing said inlet stream along a primary flow path terminating in outlet means for discharging said stream from said enclosure, permanent magnet means for generating a magnetic flux field traversing said primary flow path and having a flux or polar axis oriented substantially normal to said primary flow path, deflecting means positioned in said primary flow path for directing said stream through said flux field along secondary flow paths angularly displaced from the direction of said primary flow, and outlet means for discharging said stream from said enclosure.

In yet a further aspect, the invention includes the contacting of aqueous streams subsequent to completion of the magnetic treatment with anode means.

The invention is explained by reference to the accompanying drawings wherein:

BRIEF DESCRIPTION OF THE DRAWINGS

FIG. 1A is an exploded view of a portion of the apparatus of FIG. 1;

FIG. 1B is an exploded view of a portion of the apparatus of FIG. 1;

FIG. 5 is a plan illustration of an embodiment of the invention depicting an arrangement of deflecting means;

FIG. 6 is an isometric illustration depicting an arrangement deflecting and magnet means in accordance with yet another embodiment of the invention;

FIG. 7 is an isometric illustration of an embodiment similar to FIG. 1.

The invention is described but not limited by specific reference to the treatment of calcarious water. In the accompanying drawings, like reference numerals designate similar parts throughout the several views wherein;

DETAILED DESCRIPTION OF THE INVENTION

Figure 1:
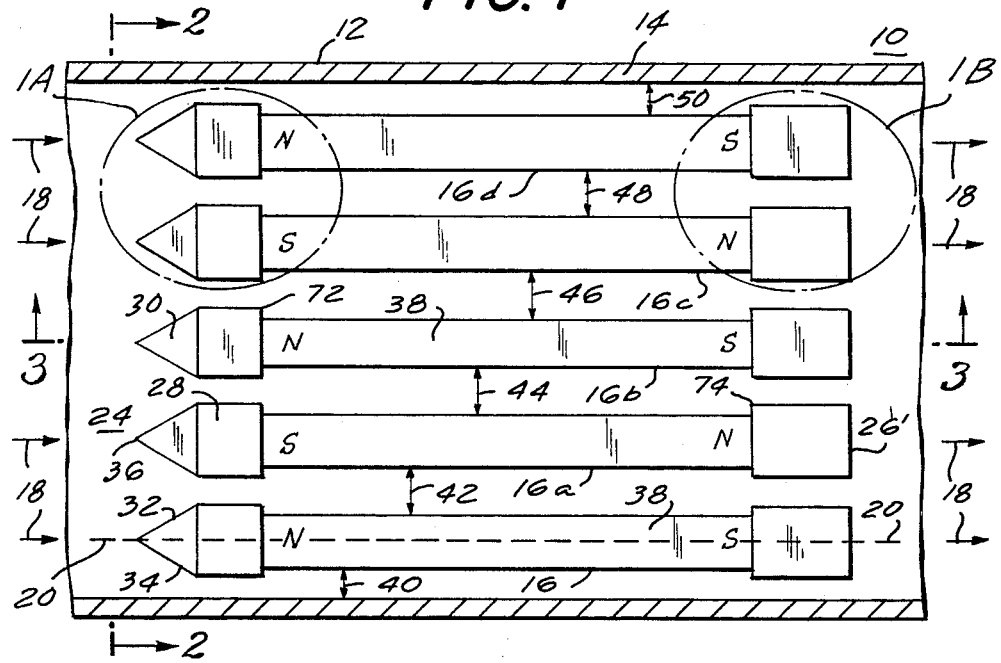
FIG. 1 is a plan view, shown partly broken away, of an apparatus in accordance with the invention.
Figure 3:
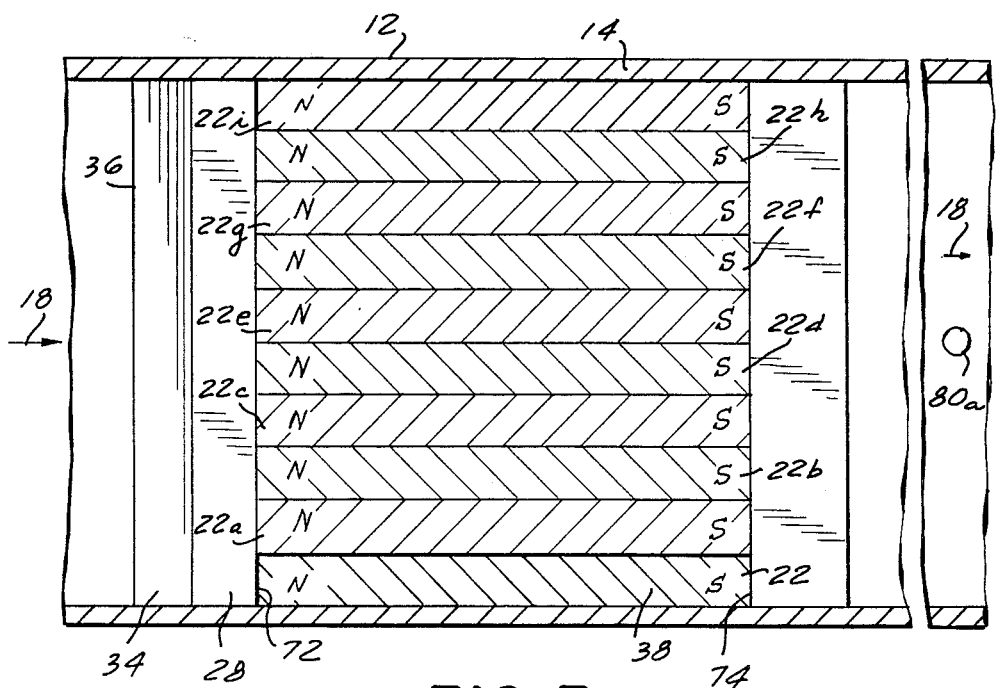
FIG. 3 is a side elevational view taken along the line 3—3 in FIG. 1.
Figure 2:
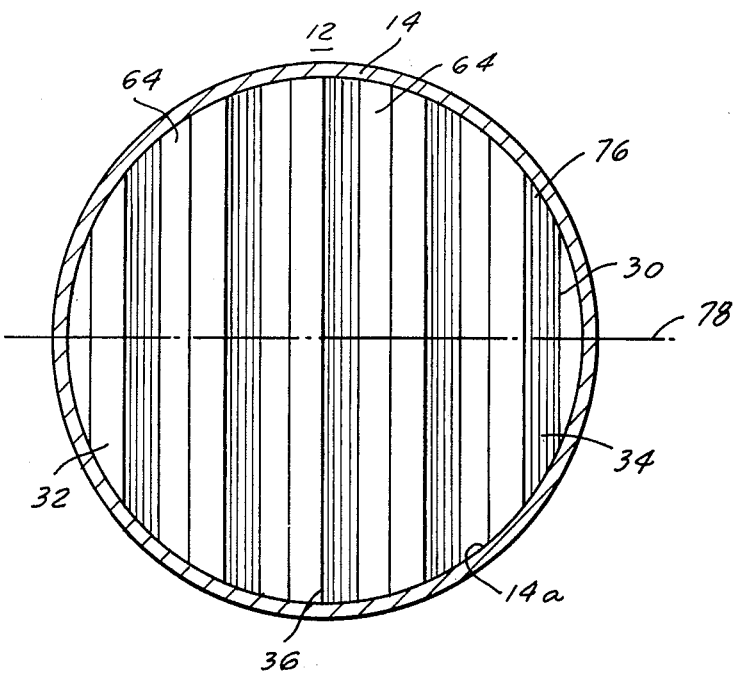
FIG. 2 is an end elevational view taken along the line 2—2 in FIG. 1.

Reference numeral 10 generally designates a conditioner in accordance with one embodiment of the invention illustrated as comprising a hollow, essentially cylindrical casing or housing 12 enclosed by sidewall portion 14 as seen in FIG. 2. Permanent magnet groupings of unitary construction and indicated at 16, 16a, 16b, 16c and 16d are arranged in parallel within housing 12, their longitudinal axes, represented at 20, being aligned with the primary flow path, indicated by directional arrows 18, of calcarious water to be treated. Each of the magnet groupings comprises a plurality of superposed, coaxially arranged bar magnets, 22, 22a, 22b, 22c, 22d, 22e, 22f and 22g 22h and 22i in registered overlying relationship polarized along their respective longitudinal axes as seen in FIG. 3 and terminating in proximal end portion 24 and distal end portion 26 joined by shank portion 38. Proximal end portion 24 comprises a head portion 28 of generally rectangular cross section and tip or deflecting portion 30 having an axis of symmetry coincident with longitudinal axis 20 and tapered counter to the direction of primary flow to provide complementary deflecting surfaces 32 and 34 which converge to provide deflecting edge 36. Opposed distal end portion 26 is rectangular in cross section having a symmetrical axis coincident with longitudinal axis 20. The terms proximal and distal are used herein to define the relative positioning of the elements so described i.e., upstream and downstream respectively, having reference to the direction of water flow. This arrangement of permanent magnet groups provides a plurality of annular flow paths 40, 42, 44, 46, 48 and 50, their physical extent being respectively defined by adjacent magnet groupings and sidewall portion 14 as seen in FIG. 2. Flux fields 52 and 54 indicated by the dotted lines in FIGS. 1A and 1B are generated across gaps 64 and 66 between the adjacent, polarly opposite facing surfaces 56 and 58 and 60 and 62 respectively, of head portion 28 and distal end portion 26. The number of magnets constituting a magnet grouping may vary and although illustrated here as being ten, a greater or lesser number can be used. In fact, a single bar magnet may suffice in some instances and particularly in the case of smaller conditioner units. Thus, the term "magnet grouping" as used herein is to be accorded a significance consistent with such variance. In general, plural magnet groupings provide flux fields of greater density and for longer periods of time and are thus generally preferred.

The magnets may be made from materials well known for such purposes including alnico and such other permanently magnetizable materials as the ferrites, e.g., barium ferrite. In particulate form, the ferrites may be extruded or cast in a matrix of plastic material and magnetically oriented along the desired polar axis prior to hardening. Such magnets are then permanently polarized in a strong magnetic field along the grain oriented direction attained during the forming procedure.

End portions 24 and 26 may or may not be magnetized in accordance with the invention. Non-magnetized end portions made from iron, for example, are particularly useful herein being found to markedly intensify the forces of magnetic attraction extant across gaps 64 and 66 thereby providing zones having the desired high density flux. This type of arrangement is illustrated in FIG. 1. Should end portions 24 and 26 be magnetic, the entire magnet grouping assembly may be prepared as a unitary element during the manufacturing procedure. In any event, the end and shank portions of the magnet grouping can be joined together by any suitable means such as mechanical fastener, adhesion bonding and the like to provide a structurally stable element.

It is generally recommended that the longitudinal dimension of the magnets, which would include at least the shank portion 38 be at least about 4 times its lateral dimension, be the latter width or diameter to assure optimum performance of the conditioner unit. Apparently, length/width ratios substantially below this value provide somewhat less dense flux fields in the gap areas 64 and 66 whereas values of at least about 4 tend to be promotive of a flux field-concentrating effect in such gap areas.

It is essential in the practice of the present invention that the taper of deflecting surfaces 32 and 34 be such as to provide a deflection angle of about 20° to 60° with respect to the flux or polar axis with a range of about 40° to 60° being preferred. With respect to the direction of primary flow, the deflection angle is from about 30° to 70° with a range of 30° to 50° being preferred. The mass of calcarious water entering conditioner 10 proceeds along primary flow direction 18 encountering vertical deflecting edges 36 and proceeds along the secondary flow paths indicated at 68 and partly defined by deflecting surfaces 32 and 34 thereupon intersecting flux field 52 at the predetermined deflection angle repsersented at 70. Assuming a relatively constant mass water flow through conditioner 10, the local velocity of the deflected water mass angularly traversing flux field 52 across gap 64 is necessarily increased since a given mass of water must traverse a greater distance than would be the case had flux field traverse been made along the primary flow direction 18. In effect, the described arrangement is conducive to an essentially shear angle traversal of the flux field by the water, this having been found to significantly enhance the effects of the magnetic treatment in respect to the scaling and encrustation problems referred to hereinbefore. In fact, expressed according to a mathematical significance, the extent of the improvement seems to vary according to a geometrical progression directly related to the shear angle velocity of the water.

The water mass, after completing its traverse of flux field 52 in the manner described, enters flow paths 40, 42, 44, 46, 48 and 50. For purposes of simplicity, the discussion will be limited to flow path 48, illustrated here as having a width somewhat greater than that of gap 64 thereby resulting in decreased water velocity through this zone. It is generally recommended that the lateral dimension of head portion 28 exceed that of shank portion 38 by a factor of from about 1.2 to 1.5 in order to achieve optimum Venturi effects. Thus, water flow across proximal end portion 24 proceeds from a zone of relatively low pressure and velocity through a deflecting zone of relatively high velocity and pressure and again to a zone-flowpath 48- of relatively low velocity and pressure. The generally rectangular shape of head portion 28 provides edge portions 72 which tend to impart turbulence to the water as it enters flowpath 48. Turbulence is desirable at this point in the treatment as it provides a thorough mixing action which is conducive to a more uniform i.e., homogeneous dispersion of molecular complexes or other innocuous species which may have been formed as a result of the magnetic treatment. The water continues along flowpath 48 through a zone of minimum velocity and pressure, approximately midway between proximal end portion 24 and distal end portion 26 eventually contacting and traversing flux field 54 across gap 66. Edge portion 74 like edge portion 72 imparts a measure of turbulence to the water immediately prior to its entering the flux field. On the basis of experimental evidence gathered from numerous test runs, traversal of flux field 54 by the turbulent water mass confers yet additional beneficial effects serving to further reduce the scaling and encrusting tendencies of the water. Apparently, a fraction of the water velocity, which is multidirectional in view of such turbulent effects, is directed along shearing angles with respect to the flux field. As a consequence, the aforementioned beneficial effects are realized although to a markedly lesser extent when compared to those achieved at proximal end portion 24. In accordance with a valuable embodiment of the invention, one or more deflecting means of the type illustrated at 84, 84a and 84b in FIG. 5 may be included in flow path 48 positioned to deflect the water through flux field 54 in the aforedescribed manner.

As illustrated in FIG. 2, lateral edge portions 76 of magnet groupings 16-16d inclusive, fall within the right cylindrical plane of the inner surface 14a of sidewall portion 14 and are joined thereto by suitable mechanical or chemical means (not shown) such as screw fastener, bonding adhesive and the like. Though illustrated as being of cylindrical cross section, housing 12 may be of any suitable shape such as curvilinear, e.g., oval, or rectilinear such as polygonal e.g., rectangular, etc. Materials of construction therefor include, without limitation, metal as well as suitable plastics such as the organic, film-forming, synthetic polymers including, for example, polyethylene, polypropylene, polyvinyl chloride, polyvinylidene chloride, polyacrylates and the like having good impact and solvent resistant properties, particularly with respect to both low and high temperature water. Housing 12 may be formed by extrusion, molding, die casting etc., whichever is appropriate to the design specified. If desired, the design may include radially, inwardly projecting rib portions extending longitudinally and having a length and width adapted to snugly accomodate the lateral edge portions 76 of magnet groupings 16-16d inclusive thereby providing support means therefor. In such cases, the material comprising such rib portions should have a high permeance.

Figure 4:
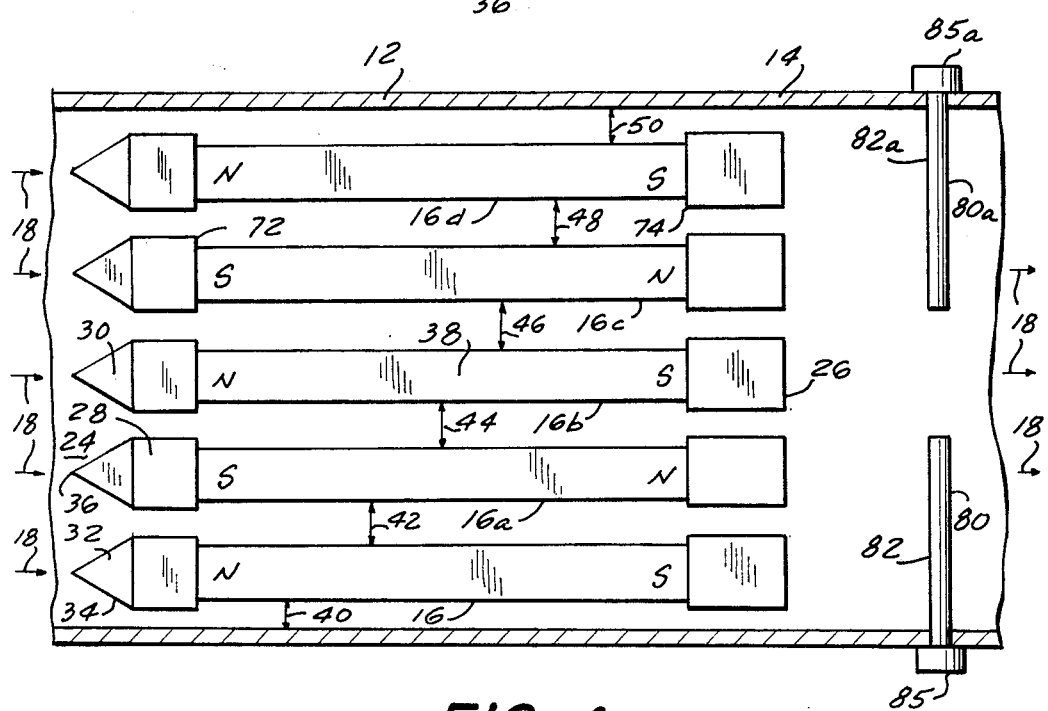
FIG. 4 is a plan view, shown partly broken away, of an apparatus in accordance with a further embodiment of the invention.

In the embodiment illustrated in FIG. 2, sidewall portion 14 is fabricated from material having a high permeance since the flux path must be established across flowpaths 40 and 50 between magnet groupings 16 and 16d and sidewall portion 14 respectively. In this situation, should it be desirable to couple the conditioner to another unit such as that described in the aforementioned U.S. Pat. No. 4,146,479, the respective units should be separated by a material having a low permeance to avoid any possibility of short circuiting the flux fields and thus the coupling means should be selected accordingly. However, should the housing of the present conditioner and or adjunct unit be constructed from low permeance material, no such precautions need be observed. On the other hand, should housing 12 have a low magnetic permeance, the outermost magnet groupings, i.e., 16 and 16d in FIG. 4 should be contiguous with sidewall portion 14 in order that all flowpaths proceed between adjacent, polarly opposite head portions 28.

The number of magnet groups provided within housing 12 may vary over a relatively wide range having reference to the size of the housing and the mass velocity of the water to be treated. Within the limitations imposed by generally accepted design flow rates, it is generally recommended that the ratio of the width of gap 64 and corresponding gap 66 to the maximum internal lateral dimension of the housing be from about 1/32 to 1/16, preferably, and can approach ½. With reference to FIG. 1, 1A and 1B, the width value would be the normal distance separating facing surfaces 56 and 58 of respective head portions 28. The maximum lateral dimension of the housing would be determined along line 78 in FIG. 2 extending diametrically through the geometric center of said housing in a direction normal to the vertical axis of the magnet groupings 16–16d. In the case of irregularly shaped housings, the maximum lateral dimension may be taken as an average value or otherwise empirically determined to fix optimum parameters. The longitudinal dimension of head portion 28, which generally corresponds in shape and size with distal end portion 26, is such as to provide a ratio, on the basis of the overall length of the magnet groupings, within the range of from about 1:3 to 1:6. The overall size of deflecting surfaces 32 and 34 is of course determined by the size of the adjacent head portion as well as the taper angle 70. A typical 6 inch pipe unit constructed in accordance with the invention might have, for example, four magnet groupings, each having a width of 1 to 1½ inches across the head portion and defining gaps having a width ranging from about 3/16 to ⅜ inch. Correspondingly, a four inch pipe unit would be provided with three magnet groups having dimensions in accordance with the previously defined limitations. The foregoing dimensions and variant ranges are given for illustrative purposes only and may be departed from in a specific circumstance to accomodate problems unique to a given set of imposed operating conditions. Thus, proximal and distal end portions 24 and 26 need not be oversized with respect to shank portion 38 as illustrated but may be symmetrical therewith in all aspects. In this case, the width of the respective flux and flow paths will be equal, the water streams proceeding along opposed secondary flowpaths providing adequate turbulence upon their convergence to assure the described mixing action as well as angular flow traversing flux field 54. In addition, it will be understood that the shape of head portion 28 may be varied so as to provide a multiplicity of edge portions for imparting turbulence and thus need not be rectangular as shown. Similar considerations apply to deflecting or tip portion 30. Although illustrated as being of essentially pyrimidal cross section, other multifaceted configurations are feasible provided the described shear angle traversal of the flux fields occur. Best results obtain however, when at least a major portion of the water for treatment is deflected along secondary flow paths angled as described with respect to the primary flow direction and magnetic flux axes.

The term primary flow path as used herein refers principally to the path or paths along which the mass body of water flows in traversing the conditioner unit. The path is physically defined as shown herein by the magnet members in conjunction with housing 12. In other embodiments to be discussed, the primary flow path is defined by means other than the magnets although the latter may be integral with or otherwise supported by the magnets. Thus, the primary flow paths are defined also as fluid passageways. The primary flow direction refers to the principal direction of water flow along a given portion of the primary flow path. Generally, this direction is aligned with the longitudinal axis of the primary flow path as is evident from the foregoing.

In accordance with a further aspect of the invention, proximal end portion 24 as defined by head portion 28 and tip portion 30 may be provided as a separate unit for detachable joinder to the main body of magnets. This enables the deflecting angle 70 to be varied by merely replacing a given end portion with a like unit but having deflecting surfaces disposed at the desired angle. This permits the in situ calibration of the conditioner unit to determine optimum design parameters under any one set of water treatment operating conditions. This modification can be effectuated by relatively simple means including screw fastener, bolt and the like adapted to matingly engage coaxially arranged threaded bores provided in the aforesaid end and shank portions of the magnet groupings. As a further alternative, either or both of deflecting surfaces 32 and 34 may be adapted to detachably receive in superposed, laminated relationship therewith, an overlying member having, for example, a varying thickness along its major surface plane(s) enabling the variance of angle 70. In accordance with yet a further alternative, external means communicating with the lower lateral edge of tip portion 30 through sidewall portion 14 may be provided enabling the positional manipulation of both of deflecting surfaces 32 and 34 to vary the deflection angle 70.

In accordance with a preferred embodiment of the invention, the water, treated as described herein, contacts anode members 80 and 80a (FIG. 4) having anode portions 82 and 82a detachably attached to sidewall portion 14 by screw cap members 85 and 85a. The anodes, preferably of the magnesium type, project from the approximate vertical midpoint of sidewall portion 14 into the primary flow path of the treated water a distance equal to from about 30 to 45% of the maximum lateral dimension of housing 12. The anode members though depicted as being of essentially cylindrical cross section (FIG. 3) may be of any desired shape. A single anode member may be sufficient with smaller conditioner units and/or applications wherein lesser quantities of water are being treated. As is known, systems involved with water are constructed of dissimilar metals such as copper pipe, iron boilers, steel valves, etc., and consequently are subject in differing degrees to electrolytic or galvanic attack. The magnesium anode in aqueous media provides protective ions which function to effectively insulate the process equipment, piping etc., from the destructive effects of electrolytic or galvanic action. The anode must of course be replaced periodically. Metals other than magnesium may be used provided they be "higher" in the electromotive series than the metal components they serve to protect.

FIG. 5 illustrates an embodiment of the invention wherein the deflecting means are provided as independent elements 84, 84a and 84b, physically separate from the magnet groupings 86 and 88. The deflecting elements are similar in design to tip portion 30 (FIG. 1) having deflecting surfaces 87 and 89 joined by base portion 91 and tapered as previously discussed hereinbefore to provide deflecting edge 90. This arrangement is particularly useful with larger gap sizes, indicated at 92, and correspondingly larger flow paths, indicated at 94. The elements are preferably arranged in parallel and equally spaced with reference to each other and magnet groups 86 and 88. The width of base portion 91 indicated at w in FIG. 5 will obviously be somewhat smaller than that for the corresponding elements in FIG. 1, assuming an approximately equal gap size, to allow for the inclusion of plural elements as will the dimensions of deflecting surfaces 87 and 89, assuming an approximately equal deflecting angle.

The principal limitations imposed upon the number of deflecting means permitted relates to the size of the deflecting surfaces. Thus, the length of the surfaces, indicated at L in FIG. 5, should be sufficient to assure deflection of the entering water along the described secondary flowpaths throughout its traversal of the flux field indicated at 96. In addition, mutual spacing of the deflection elements should be such as to insure against departure of the deflected water from the direction of the secondary flowpaths which might otherwise occur due to convergence of the water streams from adjacent deflecting surfaces which are directionally opposed. Determination of optimum parameters here can be readily determined by routine investigation.

Magnets of the disc type provided as a unitary structure are also suitable for use herein. FIG. 7 illustrates such an embodiment wherein a series of five diametrically polarized, disc type magnets, 98, are arranged coaxially having an axis of symmetry parallel to the primary flow path direction 18. Adjacent magnet groupings 100 and 102 define a flux field 106 throughout the length of flowpath 104 as indicated by the dotted lines. Proximal end portion 108 which may or may not be magnetized is of a material having a high magnetic permeance and comprises head portion 109 and tip portion 111, the latter being tapered as hereinbefore described to provide deflecting surfaces 110 and 112 convergent to provide deflecting edge 114. The arrangement is in accordance with the dimensional limitations previously described in conjunction with FIG. 1. This embodiment has the advantage of a relatively constant, high density flux field in view of the plurality of flux or polar axes established between facing, polarly opposed magnet members as illustrated.

A highly effective variant of the FIG. 7 embodiment is illustrated in FIG. 6 wherein a series of deflecting elements 116, 116a and 116b, identical in size and configuration with tip portion 30 in FIG. 1 are provided as separate elements positioned in series in the flowpath 118 defined by adjacent magnet groups 100 and 102. According to this embodiment, water entering flowpath 118 undergoes a series of deflections, and thus shear angle traversals, of the essentially constant flux field along the path of flow. The deflection elements 116 may be positioned as desired in flowpath 118 but are generally most effective when positioned equidistant between the adjacent magnet groups and uniformly spaced along the flowpath. Deflecting element 116, for best results, is positioned immediately adjacent the entrance to the flux field. The total number of deflecting elements utilized according to this embodiment would depend, for example, upon the mass water flow, the size of the flowpaths, size of the deflecting elements, and the like. The number, size and shape of magnets used is not a critical factor apart from the limitation given hereinbefore. Ultimate selection here depends, for example, on the design flow rate, severity of the treatment problem etc., which are readily ascertainable by relatively routine means. Moreover, the flowpaths may differ in size depending upon the size and spacing of the magnets or other means used to define such flowpaths.

It will be understood that the foregoing embodiments may be combined in one or more aspects as desired. Thus, the series arrangement of deflecting elements illustrated in FIG. 6, may be incorporated into the FIG. 1 and related embodiments and positioned to facilitate shear angle traversal of the flux field at distal end portion 26. In all cases, the deflecting elements may be constructed to allow for modification of the deflection angle in the manner previously described. With respect to the embodiments of the type illustrated in FIG. 6, the deflection elements, 116, 116a, and 116b may, for example, be detachably mounted to the housing to enable their replacement with like elements but more appropriate to the conditioning treatment at hand or alternatively, be adapted to receive overlay members for varying the deflection angle.

It will be apparent from the foregoing that the concept of shear angle flux field traversal as described herein has applicability to most any conditioner unit and method wherein water for treatment is caused to traverse a flux field provided in the flowpath. Apart from this aspect, the relative arrangement of magnet groups and water flow paths is not a critical factor. Thus, in some instances, the water flowpaths may be defined by elements not directly including the magnet groupings, the latter being physically remote from such flowpaths. In some instances, the magnet groupings in conjunction with its container may merely provide support means for exterior members arranged to define one or more flowpaths. Such an arrangement is illustrated, for example, in U.S. Pat. No. 4,146,479. Thus, the term primary flow path or direction as used herein merely refers to the water flow direction indicated at a given point in the overall flow pattern as previously defined. The fact that the primary flow path may be multidirectional as described in the referenced patent does not limit the applicability of the present invention which is concerned with the method and means for deflecting the water from the indicated primary flow path, whatever its directional orientation, prior to or simultaneously with its contacting one or more flux fields.

The embodiments discussed in detail herein are particularly preferred since the magnet groups provide a dual function, namely, providing means for (a) defining the primary flowpaths and (b) generating the requisite flux fields. In order to protect the magnets and magnetized elements from the oxidative effects of prolonged exposure to calcarious water as well as the abrasive effects of entrained sediment, it is generally advisable to coat all such elements with a protective, polymeric, film-forming resin substantially immune to the corrosive effects of such water with suitable resins including, for example, the epoxies. The latter are preferred being essentially non-toxic and inert under the operating conditions of the magnetic water treatment.

The present conditioner units may be utilized alone or in combination with one or more known units for such purposes as mentioned previously. In such cases, the present unit can be positioned either upstream or downstream relative to such other unit to obtain the described beneficial effects. According to one method found to be particularly advantageous, the present unit is coupled to the downstream side of the unit described in U.S. Pat. No. 4,146,479, the product water obtained across the combined units having little or no tendency to deposit foulants on surfaces thereafter contacting such water.

Although the foregoing description makes specific reference to water as the liquid stream for magnetic treatment, it will be understood that other liquids may be so treated to achieve beneficial effects. Such other liquids may or may not contain water and include organic polar solvents e.g., alkanols such as the lower alkanols as represented by ethanol, n-propanol, isopropanol, n-butanol and the like; ketones, etc; aliphatic and/or aromatic hydrocarbons and the like. Thus, it is generally found that aqueous and organic liquids treated as described herein undergo a significant reduction in surface tension correspondingly enhancing their mobility and thus flow properties making such liquids significantly more amenable to handling, processing, etc., in a variety of unit operations ranging from flash evaporation to filtration. In the case of organic liquid streams, it is found that their tendency to deposit noncrystalline types of sludges is effectively reduced. However, the manifold improvement in flow properties of the liquid may in itself be the primary objective of the magnetic treatment, even apart from the sludge reduction aspect and thus the beneficial effects provided by the invention are to be so understood. For example, unrefined oil and similar viscous liquids flow much more easily and thus require less in the way of pumping requirements when treated as described herein. Similarly, viscous reactant solutions containing one or more of the aforedescribed polar solvents not only flow more rapidly, but appear to provide greater reaction rates when contacted with co-reactant material. This appears to be attributable, at least in large part, to the molecular orientation imparted to the reactant solution as a result of the magnetic treatment making the reactant molecules more accessible to the intimate contacting required for chemical interaction.

What is claimed is:

1. A method for treating an aqueous or non-aqueous liquid stream to enhance its flow properties and reduce its tendency to deposit scales, encrustations, sludge and the like, comprising directing said stream along at least one primary flow path defined by adjacent permanent magnets arranged in parallel, each comprising a shank portion connecting longitudinally opposed proximal and distal head portions, said proximal head portion terminating in a tapered, deflecting portion, to contact and traverse a high density magnetic flux field generated between juxtaposed of said head portions and having a flux axis substantially normal to said primary flow path, the width of said head portion exceeding the width of said shank portion by a factor of at least about 1.2, the longitudinal dimension of the magnets being at least about 4 times the lateral dimension, to deflect said stream immediately prior to or substantially simultaneously with its contacting said flux field by said tapered portion along secondary flow paths causing said stream to contact and traverse said flux field at an angle of from about 20° to 60° with respect to said flux axis.

2. A method according to claim 1 wherein said stream, subsequent to said magnetic treatment contacts anode means.

3. A method according to claim 2 wherein said head portions are rectangular in cross section, and said deflecting portions are triangular in cross section terminating proximally in a vertical edge portion defined by convergent side portions and distally in a base portion connecting said side portions the latter being tapered at an angle of from about 20° to 60° with respect to said flux axis.

4. Apparatus for magnetically treating an aqueous or nonaqueous liquid stream to enhance its flow properties and to reduce its tendency to deposit scales, encrustation and the like comprising an enclosure, means for admitting a liquid stream to said enclosure, means for directing said stream along at least one primary flow path comprising adjacent permanent magnets arranged in parallel defining a flow path therebetween, the longitudinal dimension of the magnets being at least 4 times the lateral dimension, each of said magnets comprising a shank portion connecting longitudinally opposed proximal and distal head portions, said proximal head portion terminating in a tapered, deflecting portion, juxtaposed of said head portions generating a high density magnetic flux field therebetween having a flux axis normal to said primary flow path, the ratio of the width of the flow path between juxtaposed of said head portions to the width of the remainder of said primary flow path between juxtaposed of said shank portions being less than about 1:1.2, said tapered portion comprising means for deflecting said stream through said flux field at an angle of from about 20° to 60° with respect to said flux axis.

5. Apparatus according to claim 4 including anode means positioned to contact said stream after passage thereof through said flow paths defined by said magnets.

6. Apparatus according to claim 4 wherein said head portions are rectangular in cross section and said deflecting portions are triangular in cross section terminating proximally in a vertical edge portion defind by convergent side portions and distally in a base portion connecting said side portions, the latter being tapered at an angle of from about 20° to 60° with respect to said flux axis.

7. Apparatus according to claim 6 wherein the ratio of the longitudinal dimension of said head portion to the length of the magnet portion is from about 1:3 to 1:6.

* * * * *